United States Patent
Nair et al.

(10) Patent No.: US 12,325,774 B2
(45) Date of Patent: Jun. 10, 2025

(54) COPOLYMERS OF POLY(ARYL ETHER SULFONES) AND POLYDIMETHYLSILOXANE

(71) Applicant: SOLVAY SPECIALTY POLYMERS USA, LLC, Alpharetta, GA (US)

(72) Inventors: Kamlesh Nair, Alpharetta, GA (US); Joel Pollino, Johns Creek, GA (US); Stéphane Jeol, Saint-Genis Laval (FR); David B. Thomas, Milan (IT)

(73) Assignee: SOLVAY SPECIALTY POLYMERS USA, LLC

( * ) Notice: Subject to any disclaimer, the term of this patent is extended or adjusted under 35 U.S.C. 154(b) by 921 days.

(21) Appl. No.: 17/284,887

(22) PCT Filed: Oct. 21, 2019

(86) PCT No.: PCT/EP2019/078565
§ 371 (c)(1),
(2) Date: Apr. 13, 2021

(87) PCT Pub. No.: WO2020/079277
PCT Pub. Date: Apr. 23, 2020

(65) Prior Publication Data
US 2021/0380763 A1  Dec. 9, 2021

Related U.S. Application Data

(60) Provisional application No. 62/747,972, filed on Oct. 19, 2018.

(30) Foreign Application Priority Data

Jan. 15, 2019 (EP) .................................... 19151945

(51) Int. Cl.
| | |
|---|---|
| *C08G 77/06* | (2006.01) |
| *B33Y 10/00* | (2015.01) |
| *B33Y 70/00* | (2020.01) |
| *C08G 77/46* | (2006.01) |
| *C09D 183/12* | (2006.01) |
| *C09J 5/06* | (2006.01) |
| *C09J 183/12* | (2006.01) |

(52) U.S. Cl.
CPC .............. *C08G 77/46* (2013.01); *B33Y 10/00* (2014.12); *B33Y 70/00* (2014.12); *C09D 183/12* (2013.01); *C09J 5/06* (2013.01); *C09J 183/12* (2013.01); *C09J 2453/00* (2013.01)

(58) Field of Classification Search
CPC .................................. C08G 77/46; C08G 77/42
USPC ........................................................ 528/31, 15
See application file for complete search history.

(56) References Cited

U.S. PATENT DOCUMENTS

| | | | |
|---|---|---|---|
| 3,539,657 A | 11/1970 | Noshay et al. | |
| 4,871,816 A | 10/1989 | Percec et al. | |
| 6,114,445 A | 9/2000 | Tzoganakis et al. | |
| 6,339,131 B1 * | 1/2002 | Cella ...................... | C08G 77/46 528/25 |
| 7,879,971 B2 * | 2/2011 | Kim ..................... | H01M 8/1081 528/391 |
| 2006/0166067 A1 * | 7/2006 | Kiefer ................. | H01M 8/1072 429/535 |
| 2007/0218336 A1 | 9/2007 | Kim et al. | |
| 2009/0061277 A1 | 3/2009 | Sayre et al. | |
| 2009/0283476 A1 | 11/2009 | Schwab et al. | |

FOREIGN PATENT DOCUMENTS

WO      2017174546 A1    10/2017

OTHER PUBLICATIONS

Murphy J., in "Additives for Plastics Handbook", 2nd Edition, 2001, Chapter 5.2.3., p. 43-48—Elsevier Advanced Technology.

Auman B. C. et al., "Alternating block copolymers of aromatic poly(ether sulphone) and poly(dimethylsiloxane) by hydrosilylation", Polymer, 1987, vol. 28, No. 8, pp. 1407-1417—Butterworth & Co. Ltd.

\* cited by examiner

*Primary Examiner* — Margaret G Moore
(74) *Attorney, Agent, or Firm* — Beatrice C. Ortego

(57) ABSTRACT

The invention pertains to a relates to a copolymer (P1) of poly(aryl ether sulfones) (PAES) and polydimethylsiloxane (PDMS) and to the process for preparing the copolymer (P1) by melt-hydrosilylation.

18 Claims, 1 Drawing Sheet

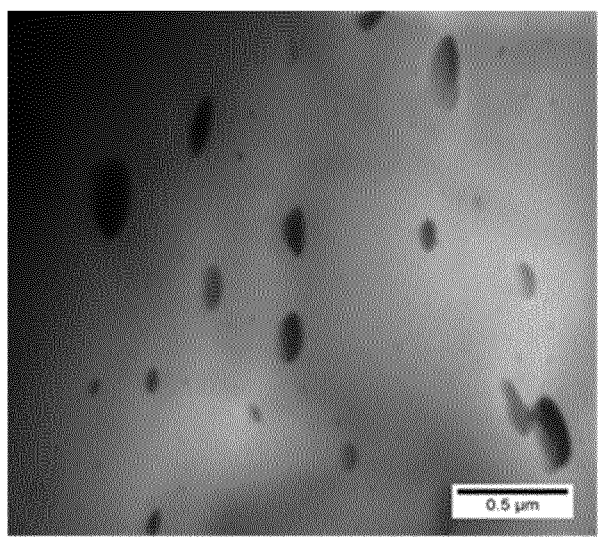

COPOLYMERS OF POLY(ARYL ETHER SULFONES) AND POLYDIMETHYLSILOXANE

CROSS-REFERENCE TO RELATED APPLICATIONS

This application is a U.S. national stage entry under 35 U.S.C. § 371 of International Application No. PCT/EP2019/078565 filed Oct. 21, 2019, which claims priority to U.S. provisional application No. 62/747,972 filed on Oct. 19, 2018 and EP patent application Ser. No. 19/151,945.3 filed on Jan. 15, 2019, the whole content of these applications being incorporated herein by reference for all purposes.

TECHNICAL FIELD

The present disclosure relates to a solvent free process to prepare a copolymer (P1) of poly(aryl ether sulfones) (PAES) and polydimethylsiloxane (PDMS) by melt hydrosilylation (addition of —Si—H groups to carbon carbon double bonds). The present invention also relates to a copolymer (P1) obtainable by such process and the use of this copolymer as a part material for 3D printing, as a hot melt adhesive for molding/over-molding applications and for the automotive, smart device and semiconductors industries.

BACKGROUND ART

Poly(aryl ether sulfones) (PAES) polymers belong to the group of high-performance thermoplastics and are characterized by high heat distortion resistance, good mechanical properties, excellent hydrolytic resistance and an inherent flame retardance. Versatile and useful, PAES polymers have many applications in electronics, electrical industry, medicine, general engineering, food processing and 3D printing.

While PAES polymers have many advantages, and good physical properties, it is sometimes desirable to tune these properties to improve performance in specific applications. Property modification can be achieved by combining two polymeric molecules to make copolymers that possess the combination of intrinsic properties of each individual molecule.

Polydimethylsiloxane (PDMS) is a thermally stable material and can be used in polymer and materials science for a wide variety of applications. PDMS has one of the lowest glass transition temperature (Tg well below 0° C.), which makes it an attractive material to incorporate in high temperature materials such as PAES polymers.

The hydrosilylation coupling reaction has been investigated to produce multiblock copolymer of PDMS with polyethersulfone (PSU). One major difficulty however is the high incompatibility of these polymers and the identification of a common reaction solvent. Sulfone polymers present a low solubility in solvents that dissolve PDMS molecules, which then limits the formation of copolymers of high molecular weight, as characterized by high melt viscosity. For example, while PDMS presents a good solubility in chloroform, poly(biphenyl ether sulfone) polymer (PPSU) has a limited solubility in chloroform.

The article from Auman B. C. et al. (Polymer 1987, 28, 1407-1417) describes the Pt-catalyzed hydrosilylation of polyethersulfone (PSU) with PDMS in diluted solution of chlorobenzene, which is then concentrated as the reaction proceed (called the dilution-concentration method). The method described in Auman et al. however does not allow to obtain copolymer of high molecular weight.

The present invention provides a solvent-free process for preparing a copolymer of PAES and PDMS of high melt viscosity.

BRIEF DESCRIPTION OF THE FIGURES

FIG. 1 shows transmission electron microscopy (TEM) micrographs of the copolymer (P1-A) of Example 1.

SUMMARY OF INVENTION

An aspect of the present disclosure is directed to A solvent-free process for preparing a copolymer (P1) of formula (L):

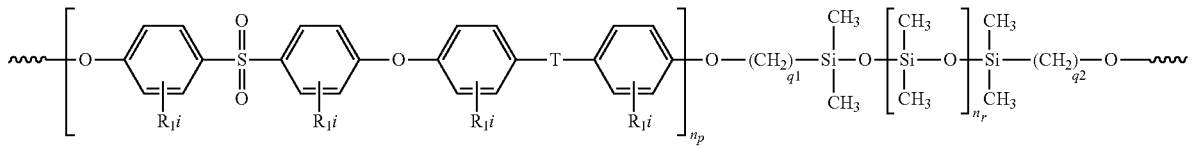

wherein
- each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each i is independently selected from 0 to 4;
- T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —($CH_2$)$_m$— and —($CF_2$)$_m$— with m being an integer from 1 to 6; an aliphatic divalent group, linear or branched, of up to 6 carbon atoms; and combinations thereof;
- $n_p$ and $n_r$ are respectively the moles % of each recurring units p and r;
- recurring units p and r are arranged in blocks, in alternation or randomly;
- $5 \le n_p < 100$;
- $5 \le n_r < 100$;
- $q_1$ and $q_2$ independently vary between 2 and 14, inclusive, comprising reacting a poly(aryl ether sulfone) (PAES) polymer (P0)

comprising:
recurring units p of formula (N):

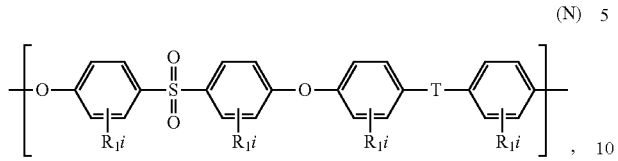

and
at least one terminal group of formula (M):

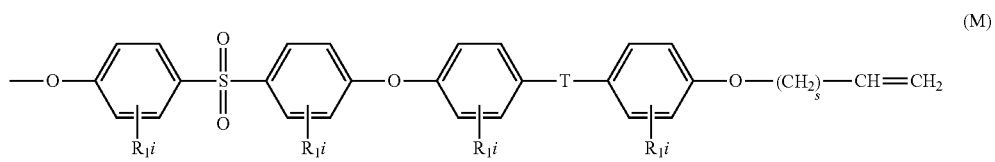

wherein $R_1$, i and T are as above-mentioned and s varies between 0 and 12, inclusive;
with a compound of formula (I):

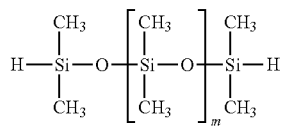

wherein m varies between 1 and 200;
wherein the molar ratio of compound (1)/polymer (P0) is 0.5:1 and 1:0.5;
optionally in the presence of a metal based catalyst;
at a temperature ranging from 150 and 450° C.

The present invention also relates to the copolymer (P1) obtained by this process.

The present invention also relates to the process for manufacturing a three-dimensional object by with an additive manufacturing system, comprising a step consisting in printing layers of the three-dimensional object from the part material comprising the copolymer of the present invention.

The present invention also relates to the use of the copolymer of the invention as a hot melt adhesive (HMA).

DISCLOSURE OF THE INVENTION

The present invention relates to a process for preparing a copolymer (P1) which is a copolymer of poly(aryl ether sulfones) (PAES) and polydimethylsiloxane (PDMS), by hydrosilylation in the absence of any solvent (also called hereby melt-hydrosilylation). This copolymer can for example be used as a part material in an additive-manufacturing process, as well as for the automotive, smart device and semiconductor industries. It can also be used as hot melt adhesive for molding or overmolding applications. More details are given below regarding the applications of copolymer (P1).

The present invention also relates to the copolymer obtainable by this process and the use of the copolymer notably for 3D printing.

The methods of the prior art take place in solvents; however the low solubility of the highly-incompatible PAES and PDMS polymers in solvents limits the molecular weight built of the copolymer. This is mainly due to the limited solubility of PAES in solvents that dissolve PDMS (e.g. chloroform). The process of the present invention is solvent free, which means that the solubility of the polymers is not a limiting factor to the preparation of copolymer of higher molecular weight. Additionally, the solvent less process of the invention avoids the necessity of post-reaction purification steps.

Additionally, the reaction takes place at a fast reaction rate and in a short reaction time. It is a low cost process, and leads to high yields obtained. Furthermore masterbatches with different resins can be made in single step.

The inventors have shown that the solvent free process of the present invention allows the production of copolymers of high viscosity.

The hydrosilylation process of the present invention is solvent free, which means that the process is conducted in the melt, in the absence of a solvent or in the presence of limited quantity of solvent. For example, the process of the present invention may be carried out in the presence of less than 5 wt. % of solvent, for example less than 4 wt. %, less than 2 wt. % or less than 1 wt. %, based on the total weight of the reaction mixture. According to an embodiment, the hydrosilylation process of the present invention is solvent-free, is carried out in the absence of a solvent selected from the group consisting of anisole, dimethylformamide, dimethyl sulfoxide, sulfolane, N-methyl-2-pyrrolidone and N-ethyl-2-pyrrolidone or, alternatively in the presence of limited quantity of one of these solvents (as detailed above).

The reaction can be carried out in equipment made from materials inert toward the polymers. In this case, the equipment is chosen in order to provide enough contact of the polymers, and in which the removal of volatile reaction products is feasible. Suitable equipment includes agitated reactors, extruders and kneaders, for example mixing kneaders from List AG or BUSS. The use of mixing kneaders may notably be useful to prepare a solvent-free PPSU for reasons of the residence time which can be longer than in an extruder.

Copolymer (P1)

The copolymer (P1) of the present invention is according to formula (L) below:

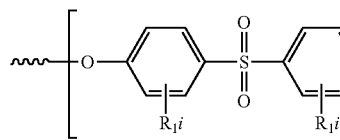 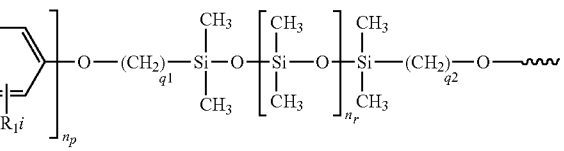

wherein
- each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each i is independently selected from 0 to 4;
- T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —($CH_2$)$_m$— and —($CF_2$)$_m$— with m being an integer from 1 to 6; an aliphatic divalent group, linear or branched, of up to 6 carbon atoms; and combinations thereof;
- $n_p$ and $n_r$ are respectively the moles % of each recurring units p and r; recurring units p and r are arranged in blocks, in alternation or randomly;
- $5 \leq n_p < 100$;
- $5 \leq n_r < 100$;
- $q_1$ and $q_2$ independently vary between 2 and 14, inclusive.

More precisely, the present invention relates to copolymers of PAES and PDMS, for example di-blocks, tri-blocks, or multi-block copolymers. The copolymer (P1) of the present invention can be used directly or in a composition of matter, for melt processing like melt-blending, molding, extrusion or solution processing like 3D-printing process and also used as compatibilizers for blends of their high molecular weight homologues or as a high-temperature adhesive.

The copolymer (P1) of the present invention may have a structure as follows:

PAES-b-(PDMS-b-PAES-b)$_g$-PAES wherein
g varies from 0 to 20, for example from 0 to 10, and
b is —O—($CH_2$)$_{q1}$—Si($CH_3$)$_2$—O— or —O—($CH_2$)$_{q2}$—Si($CH_3$)$_2$—O— with $q_1$ and $q_2$ as above defined,
for example b is —O—($CH_2$)$_2$—Si($CH_3$)$_2$—O—.

The PAES block of the copolymer (P1), as detailed below, depending of the nature of T, can for example be a poly(biphenyl ether sulfone) (PPSU), a polysulfone (PSU) or a polyethersulfone (PES). The copolymer (P1) may notably comprise different PAES blocks, for example, a PPSU block and a PES block. According to this embodiment, the block copolymer (P1) may have a structure as follows:

PPSU-b-(PDMS-b-PES)$_{g'}$-(PDMS-b-PPSU)$_{g''}$-PES wherein
g' and g" varies from 0 to 20, for example from 0 to 10, and
with b, $q_1$ and $q_2$ as above defined.

According to an embodiment, $R_1$ is, at each location in formula (L), independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, i is zero for each $R_1$ of formula (L). In other words, according to this embodiment, the recurring units p are unsubstituted.

According to an embodiment of the present invention, the PAES block polymer is such that T is selected from the group consisting of a bond, —$SO_2$— and —C($CH_3$)$_2$—.

According to yet another embodiment of the present invention, the PAES block polymer comprises recurring units selected from the group consisting of formulas (N-A), (N-B) or (N-C):

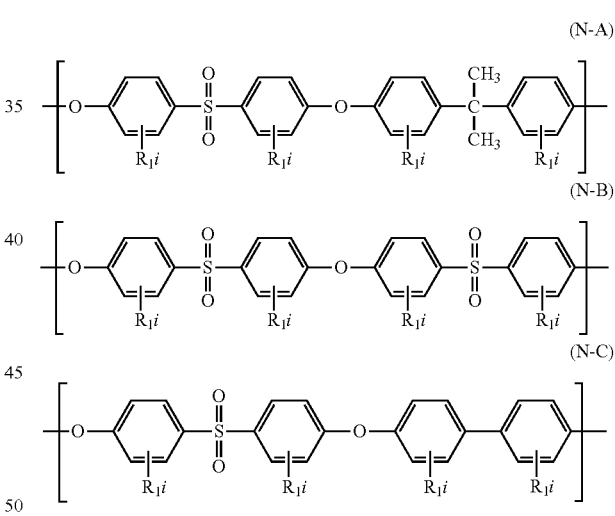

According to another embodiment of the present invention, the PAES block polymer comprises at least 50 mol. % (based on the total number of moles in the PAES polymer) of recurring units of formulas (N-A), (N-B) and/or (N-C).

According to yet another embodiment of the present invention, the PAES block polymer comprises at least 50 mol. % (based on the total number of moles in the polymer) of recurring units selected from the group consisting of formulas (N-A), (N-B) and (N-C), wherein i is zero for each $R_1$.

According to another embodiment of the present invention, at least 60 mol. %, at least 70 mol. %, at least 80 mol. %, at least 90 mol. %, at least 95 mol. %, at least 99 mol. % or all of the recurring units in the PAES block polymer are recurring units p of formula (L) or formula formulas (N-A), (N-B) and (N-C).

According to an embodiment, the PAES block polymer has a Tg ranging from 90 and 250° C., preferably from 170 and 240° C., more preferably from 180 and 230° C., as measured by differential scanning calorimetry (DSC) according to ASTM D3418.

According to an embodiment, the PAES block polymer is a poly(biphenyl ether sulfone) (PPSU) with at least 50 mol. % of (based on the total number of moles in the polymer) of recurring units of formulas (N-C); for example according to this embodiment, the PAES block polymer is a PPSU with at least 60 mol. %, at least 70 mol. %, at least 80 mol. %, at least 90 mol. %, at least 95 mol. %, at least 99 mol. % of recurring units of formula (N-C). According to another embodiment, all of the recurring units in the PAES block polymer are recurring units of formulas (N-C) for example wherein i is zero for each $R_1$.

wherein $q_1$, $q_2$, $n_p$, and $n_r$ are as above-mentioned described, preferably wherein $q_1$ and $q_2$ both equal 2 and preferably wherein $50 \leq np < 100$.

According to an embodiment, the PAES block polymer is a polysulfone (PSU) polymer with at least 50 mol. % of (based on the total number of moles in the PAES polymer) of recurring units of formula (N-A); for example according to this embodiment, the PAES block polymer is a PSU with at least 60 mol. %, at least 70 mol. %, at least 80 mol. %, at least 90 mol. %, at least 95 mol. %, at least 99 mol. % of recurring units of formula (N-A). According to another embodiment, all of the recurring units in the PAES block polymer are recurring units of formula (N-A), for example wherein i is zero for each $R_1$.

According to an embodiment, the copolymer (P1) is according to formula (L-A):

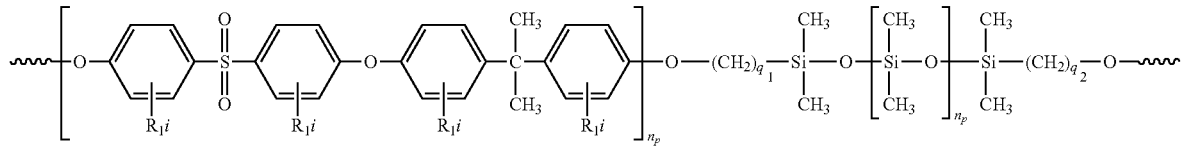

wherein $R_1$, i, $q_1$, $q_2$, $n_p$, and $n_r$ are as above-mentioned described.

A poly(biphenyl ether sulfone) polymer (PPSU) is a polyarylene ether sulfone which comprises a biphenyl moiety. Poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone in presence of a base. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group.

PPSU is commercially available as Radel® PPSU from Solvay Specialty Polymers USA, L.L.C.

According to an embodiment, the copolymer (P1) is according to formula (L-C):

PSU is available as Udel® PSU from Solvay Specialty Polymers USA, L.L.C.

According to an embodiment, the PAES block polymer is a polyethersulfone (PES) polymer with at least 50 mol. % of (based on the total number of moles in the PAES polymer) of recurring units of formulas (N-B); for example according to this embodiment, the PAES block polymer is a PES with at least 60 mol. %, at least 70 mol. %, at least 80 mol. %, at least 90 mol. %, at least 95 mol. %, at least 99 mol. % of recurring units of formula (N-B). According to another embodiment, all of the recurring units in the PAES block polymer are recurring units ($R_{PES}$) of formula (N-B), for example wherein i is zero for each $R_1$.

According to an embodiment, the copolymer (P1) is according to formula (L-B):

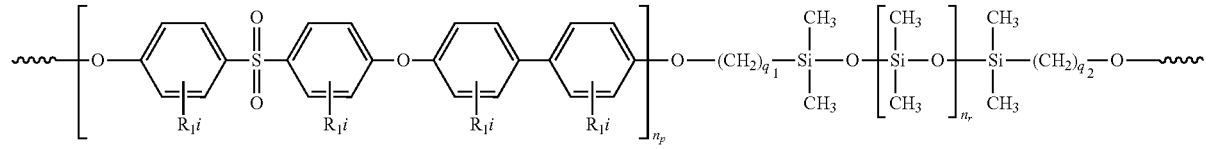

wherein $R_1$, i, $q_1$, $q_2$, $n_p$, and $n_r$ are as above-mentioned described.

According to preferred embodiment, the copolymer (P1) is according to formula (L-C'):

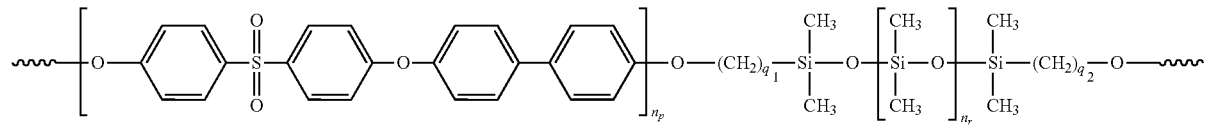

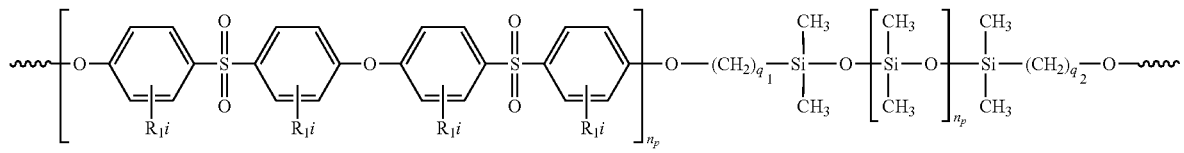

wherein $R_1$, i, $q_1$, $q_2$, $n_p$, and $n_r$ are as above-mentioned described.

PES is available as Veradel® PES from Solvay Specialty Polymers USA, L.L.C.

According to an embodiment of the present invention, the PAES block polymer has a number average molecular weight (Mn) of less than about 25,000 g/mol, less than about 18,000 g/mol, or less than about 17,000 g/mol, as measured by gel permeation chromatography (GPC) using methylene chloride as a mobile phase, with polystyrene standards.

According to an embodiment of the present invention, the PAES block polymer has a number average molecular weight (Mn) of no less than about 1,000 g/mol or no less than about 2,000 g/mol, as measured by gel permeation chromatography (GPC) using methylene chloride as a mobile phase, with polystyrene standards.

According to an embodiment of the present invention, the PDMS block has a viscosity $\mu$ at 25° C. in the range from $1 \times 10^2$ to $2.5 \times 10^6$ centistokes (1 to 2.5 m²/second).

According to an embodiment of the present invention, the PDMS block has a number average molecular weight (Mn) of less than 35,000 g/mol, less than 30,000 g/mol, or less than 25,000 g/mol, as calculated based on AJ Barry's equation: Log $\mu$(cSt)=1.00+0.0123 (Mn)$^{0.5}$.

According to an embodiment of the present invention, the PDMS block polymer has a number average molecular weight (Mn) of at least 1,000 g/mol, at least 2,000 g/mol or at least 3,000 g/mol, as calculated based on the above equation.

In formula (L), $n_p$ and $n_r$ are respectively the moles % of each recurring units p and r. Recurring units p and r are arranged in blocks, in alternation or randomly. The copolymer (P1) comprises at least recurring units p and r, but may also comprise additional recurring units. The copolymer (P1) comprises at least 5 mol. % of recurring units p and at least 5 mol. % of recurring units p. In other words, $5 \leq n_p < 100$ and $5 \leq n_r < 100$.

According to an embodiment of the present invention, the copolymer (P1) comprises at least 10 mol. % of recurring units p, for example at least 20 mol. %, at least 30 mol. %, at least 40 mol. %, at least 50 mol. %, at least 60 mol. % or at least 70 mol. %, based on the total number of moles in the copolymer (P1).

According to another embodiment of the present invention, the copolymer (P1) comprises at least 10 mol. % of recurring units r, for example at least 15 mol. %, at least 20 mol. %, at least 25 mol. %, at least 30 mol. %, at least 35 mol. % or at least 40 mol. %, based on the total number of moles in the copolymer (P1).

According to another embodiment of the present invention, the copolymer (P1) comprises from 5 to 85 wt. % of PDMS blocks, based on the total weight of the copolymer, for example from 10 to 60 wt. % or from 20 to 40 wt. %. The copolymer (P1) of the present invention may notably comprise from 30 to 50 wt. % of block copolymer having a Mn ranging from 4,000 to 10,000 g/mol, based on the total weight of the copolymer. Alternatively, the copolymer (P1) of the present invention may comprise from 5 to 40 wt. % of block copolymer having a Mn ranging from 15,000 to 25,000 g/mol, based on the total weight of the copolymer.

The PDMS content of the bock copolymers of the present invention can be varied by changing the molecular weight of PDMS blocks used in the melt hydrosilylation.

According to an embodiment of the present invention, $n_p + n_r = 100$. According to this embodiment, the copolymer (P1) consists essentially in recurring units p and r.

In formula (L), $q_1$ and $q_2$ independently vary between 2 and 14. According to an embodiment, $q_1$ and $q_2$ independently vary between 2 and 12, for example between 2 and 11. Preferably, $q_1$ and $q_2$ are equals. Preferably, $q_1$ and $q_2$ equal 2 or 11.

Process to Prepare Copolymer (P1)

The present invention notably provides a solvent free process for preparing copolymer (P1) starting from a functionalized poly(aryl ether sulfones) (PAES), hereby called functionalized PAES polymer (P0). The PAES polymers are functionalized with reactive functional groups on at least one end of the PAES polymer, preferably on both ends of the PAES polymer. The functionality is introduced to at least one chain terminus of the PAES polymers and the resulting intermediates can then be used further to synthetize block copolymers by solution chemistry or chemistry carried out in the molten phase (for instance reactive extrusion). The chain-end functional group of polymer (P0) is reactive and can therefore be used to efficiently prepare copolymers (P1).

More precisely, according to the invention, a PAES polymer is functionalized with a functional group, which is an alpha-olefin of formula $CH_2=CH-(CH_2)_s-$ wherein s varies between 0 and 12, in order to obtain PAES polymer (P0).

The functional groups are introduced as a post-polymerization modification at least one end of a PAES polymer chain (for example PPSU, PES or PSU as above-defined), for example at both ends of the PAES polymer chain.

According to the present invention, the functionalized PAES polymer (P0) comprises:

recurring units p of formula (N):

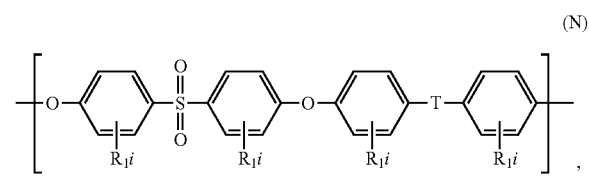

and
at least one terminal group of formula (M):

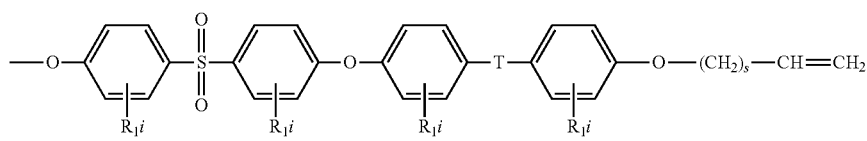

wherein
each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is independently selected from 0 to 4, inclusive;
T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each $R_a$ and $R_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof; and
s varies between 0 and 12, inclusive.

Process to Prepare Polymer (P0)

The process to prepare the poly(aryl ether sulfone) (PAES) polymer (P0) as described-above comprises the steps of reacting a poly(aryl ether sulfone) (PAES) polymer comprising:
recurring units p of formula (N):

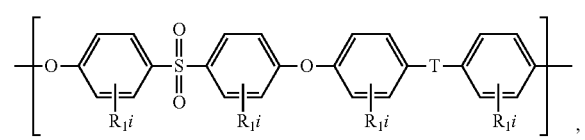

and
at least one terminal group of formula (P):

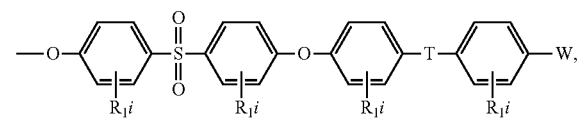

wherein:
each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is independently selected from 0 to 4;
W is O—R or S—R; and
R is H, K, Na, Li, Cs, or Q, where Q is a group containing 1 to 10 carbon atoms;

with a compound of formula (I)

$$X-(CH_2)_s-CH_2=CH_2-X \qquad (I)$$

wherein
X is Cl, Br or I;
s varies between 0 and 12, inclusive; and
wherein the molar ratio of compound (I)/polymer (PAES) is higher than 1, preferably higher than 5, more preferably higher than 10;
optionally in the presence of a base and a polar aprotic solvent at a temperature ranging from room temperature and 250° C., preferably between 70 and 120° C.

Preferably, W in formula (P) is O—R. In other words, the poly(aryl ether sulfone) (PAES) polymer preferably comprises:
at least one terminal group of formula (P'), for example two terminal groups of formula (P'):

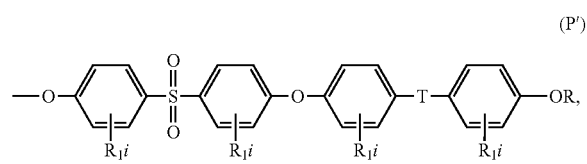

wherein $R^1$, i, T and R are as above-mentioned.

According to an embodiment, the aprotic polar solvent is at least one selected from N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane.

According to another embodiment, the base is selected from the group consisting of sodium hydroxide (NaOH), potassium hydroxide (KOH), potassium carbonate (K$_2$CO$_3$), potassium tert-butoxide, sodium carbonate (NaCO$_3$), caesium carbonate (CS$_2$CO$_3$) and sodium tert-butoxide.

The process to prepare polymers (P0) is notably described in patent application WO 2017/174546 (Solvay Specialty Polymers USA).

Process to Prepare Copolymer (P1)

The process to prepare the copolymer (P1) comprises the steps of reacting a functionalized PAES polymer (P0) with a compound of formula (I):

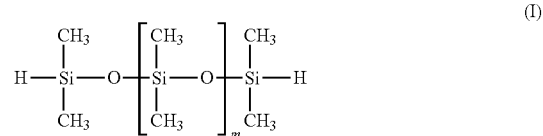

wherein m varies between 1 and 200, preferably between 10 and 100, even more preferably between 15 and 50;

wherein the molar ratio of compound (I)/polymer (P0) varies between 0.5:1 and 1:0.5, for example between 0.7:1 and 1:0.7 or between 0.8:1 and 1:0.8;

optionally in the presence of a metal based catalyst;

at a temperature ranging from room temperature and 400° C.

The process is solvent-free. In other words, the process of the invention is carried out in the absence of solvent, for example selected from the group consisting of anisole, dimethylformamide, dimethyl sulfoxide, sulfolane, N-methyl-2-pyrrolidone and N-ethyl-2-pyrrolidone, or alternatively in a limited quantity of solvents. According to the present invention, certain chemical components may be added to the reactor, for example plasticizer in order to lower the melt viscosity during the process. Examples of plasticizers are diphenyl sulfone (DPS) or phthalates. The process of the invention may be carried out in the presence of less than 20 wt. % of plasticizer, for example less than 15 wt. % or for example less than 10 wt. % of plasticizer.

The process is preferably carried out in equipment made from materials inert toward the polymers. In this case, the equipment is chosen in order to provide enough contact of the polymers, and in which the removal of volatile reaction products is feasible. Suitable equipment includes agitated reactors, extruders and kneaders, for example mixing kneaders from List AG or BUSS. The use of mixing kneaders may notably be useful to prepare a solvent-free copolymer (P1) for reasons of the residence time which can be longer than in an extruder. The equipment may for example be operated at:

a shear rate (i.e. velocity gradient in the kneading material in the gap between the rotating kneading element and the wall) in the range from 5 to 500 s$^{-1}$, preferably from 10 to 250 s$^{-1}$, in particular from 20 to 100 s$^{-1}$, and a fill level (i.e. the proportion that is filled by the starting monomers of the volume capacity in the kneader which can be filled with monomers and which permits mixing) in the range from 0.2 to 0.8, preferably from 0.22 to 0.7, in particular from 0.3 to 0.7, specifically from 0.35 to 0.64.

According to an embodiment, the process is carried out in an agitated reactor, an extruder or in a kneader.

The process of the present invention is preferably carried out in the presence of a metal-based catalyst, preferably a Platinum-based catalyst, such as Platinum(0)-1,3-divinyl-1,1,3,3-tetramethyldisiloxane (Karstedst's catalyst) or chloroplatinic acid. Other organometallic catalysts can be used as well, such as Rhodium-based catalysts or Ruthenium-based catalysts (Grubbs second generation catalyst), for example Benzylidene[1,3-bis(2,4,6-trimethylphenyl)-2-4imidazolidinylidene]-dichloro-(tricyclohexyl-phosphine) ruthenium.

The process of the present invention can also be carried out in the presence of free radical generators such as benzoyl peroxides.

The reaction temperature of this system is between 150 and 450° C., but can be maintained between 200 to 400° C., preferably between 250 and 350° C. or between 260 and 320° C.

The residence time of the reaction is typically in the order of a few minutes to an hour in the mixing apparatus. For example, the residence time varies between 1 minute and 30 minutes, for example between 2 and 15 minutes.

Composition (C)

The present invention also relates to a composition (C) comprising the copolymer (P1) as above-described. The composition may also further comprise at least one component selected from the group consisting of reinforcing agents, photoinitiators, plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers. Mention can be made notably of polyaryletherketones (PAEK) or other polyamides (e.g. polyphthalamides).

The composition (C) may for example be in the form of pellets, powder, solution or filaments.

Reinforcing Agents

The composition (C) may comprise reinforcing agents, for example from 1 to 30 wt. %, based on the total weight of the composition (C).

The reinforcing agents, also called reinforcing fibers or fillers, may be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may for example be present in the composition (C) in an amount ranging between 1 and 30 wt. %, for example between 2 and 25 wt. %, based on the total weight of the polymer composition (C).

Preparation of the Composition (C)

The invention further pertains to a method of making the composition (C) as above detailed, said method comprising melt-blending the components, for example the copolymer (P1) and the reinforcing agents, optionally any other components or additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Applications

The copolymer (P1) of the present invention or of the polymer composition (C) of the present invention may be used in a variety of applications.

Three-Dimensional Printing—Additive Manufacturing

The present invention also relates to the use of the copolymer (P1) of the present invention or of the polymer composition (C) of the present invention, for the manufacture of three-dimensional (3D) objects/articles.

All of the embodiments described above with respect to the copolymer (P1) and the polymer composition (C) do apply equally to the use for the manufacture of three-dimensional (3D) objects/articles.

The present invention also relates to a method for manufacturing a three-dimensional (3D) article with an additive manufacturing system, comprising:

providing a part material consisting in the copolymer (P1) or the polymer composition (C) as above-described, printing layers of the three-dimensional (3D) article from the part material.

According to an embodiment, the part material is heated to a temperature of at least 200° C., at least 250° C. or at least 280° C., before printing.

According to an embodiment, the step of printing comprises irradiating the part material, for example a layer of the part material deposited onto the printing surface, with UV light. The layer preferably presents a size in the range of 10 µm to 300 µm, for example 50 µm to 150 µm.

The UV light can for example be laser light. The irradiation is preferably of sufficient intensity to cause substantial curing of the polymer composition (C), for example the layer of such composition (C). Also, the irradiation is preferably of sufficient intensity to cause adhesion of the layers of polymer composition (C).

The present invention also relates to 3D objects or 3D articles obtainable, at least in part, from the method of manufacture of the present invention, using the copolymer (P1) and the polymer composition (C) herein described.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

Hot Melt Adhesive (HMA)

The present invention also relates to the use of the copolymer (P1) of the present invention or of the polymer composition (C) of the present invention, as a hot melt adhesive (HMA), for example for molding/overmolding applications, for example encapsulation of fragile components, such as electronic circuit boards or thin strands of wire.

The copolymer (P1) of the present invention or of the polymer composition (C) of the present invention can be used in general for smart devices and in the automotive and semiconductor industries.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Raw Materials

A copolymer (P1) was prepared via melt-hydrosilylation and then characterized by NMR, DSC, TEM and melt viscosity.

$^1$H NMR $^1$H NMR spectra were measured using a 400 MHz Bruker spectrometer with $CD_2Cl_2$ as a solvent. All spectra are reference to residual proton in the solvent.

DSC

DSC was used to determine glass transition temperatures (Tg) and melting points (Tm)—if present. DSC experiments were carried out using a TA Instrument Q100. DSC curves were recorded by heating, cooling, re-heating, and then re-cooling the sample between 25° C. and 320° C. at a heating and cooling rate of 20° C./min. All DSC measurements were taken under a nitrogen purge. The reported Tg and Tm values were provided using the second heat curve unless otherwise noted.

TEM

Tunneling electron microscopy was used to determine the micro-phase structure of these block copolymers. The TEM instrumentation details are as follows: Philips CM12 Transmission Electron Microscope, 20-120 kV acceleration voltage range (your images captured at 100 kV), LaB6 Filament (electron source), Images captured with Optronics QuantFire CCD.

Melt Viscosity

It is measured according to ASTM-D3835.

I. Synthesis of a PPSU-PDMS Copolymers (P1-A)

The functionalized PPSU polymer (P0-A) was prepared according to the process described in published patent application WO 2017/174546 (Solvay Specialty Polymers USA):

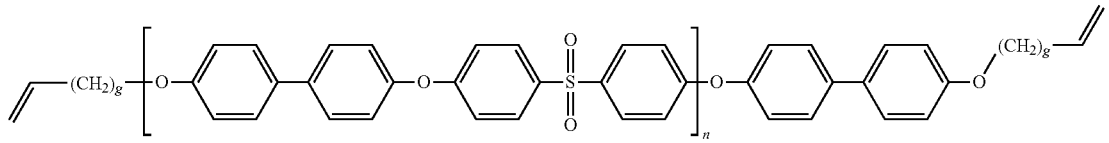

The copolymer (P1-A) was prepared according to the following process: 10 g of olefin terminated PPSU (P0-A) was mixed with 6.7 g of hydride terminated PDMS (viscosity of about 100 cst), then were added 0.02 mol % of Platinum(0)-1,3-divinyl-1,1,3,3-tetramethyldisiloxane complex solution (in xylene, Pt ~2%) and 2.95 mL of tert-Butyl hydroperoxide solution, 70 wt. % in H2O. The mixture was charged into a melt compounder (DSM Xplore 5 & 15 Micro Compounder, Model 2005, maintained at 300° C.) for 10 minutes. The melt product was then discharged, which gave a homogeneous elastic solid material.

TABLE 1

| Example | Molar ratio PPSU:PDMS#1 | Molar ratio PPSU:catalyst | Peroxide (mL) | Reaction time (mins) | Temperature (° C.) |
|---|---|---|---|---|---|
| 1 | 1:1 | 1:0.02 | 2.95 | 10 | 300 |

II. Characterization of the PPSU-PDMS Copolymer (P1-A)

The material obtained by the aforementioned process was characterized by DSC, $^1$H NMR, TEM and melt viscosity. $^1$H NMR was used to determine end group conversions and to confirm expected bond connections. DSC was used to determine glass transition temperatures (Tg) and melting points (Tm), if present. TEM was used to determine phase morphology.

Results

The copolymer was first analyzed using proton NMR. The material was first dissolved in NMP and then reprecipitated in methanol and dried and then analyzed by proton NMR. The absence of the olefinic signals in the final product indicates the formation of a covalent linkage between the two blocks. Additionally, two distinct signals were present in the spectrum of the copolymer that proved diagnostically significant in confirming the desired structure formed. The presence of —Si—(CH$_3$)$_3$— groups at 0.8 ppm indicated the presence of the PDMS block. Second, the presence of the aromatic signals at 7.0, 7.6 and 7.8 ppm indicated the presence of the aromatic polysulfone block.

The transmission electron microscopy (TEM) micrographs of the copolymer of example 1 (FIG. 1A) shows the microphase separation between the two incompatible blocks of polysulfones and PDMS. The very small domain sizes (0.5 microns) of the PDMS phase indicates the formation of a covalently bonded system between the polysulfone and PDMS.

The copolymer P1-A showed two distinct thermal events, one around 210° C. corresponding to the glass transition temperature of the polysulfone block and the other a melting peak at −44° C. corresponding to the melting point of PDMS block.

The TGA analysis of the polymer gave a single step decomposition profile with an onset of thermal degradation at 494° C.

Melt viscosity of starting material P0-A and copolymer P1-A were measured using ASTM-D3835 at 350° C.

TABLE 2

| Rate (1/s) | P0-A Visc. (Pa-s) | P1-A Visc. (Pa-s) |
|---|---|---|
| 100 | 42.5 | 369.9 |
| 1,000 | 23.6 | 174 |

The significant viscosity increase after the reactive blending indicates the presence of a high molecular weight copolymer (P1-A) as compared to the starting material (P0-A).

The invention claimed is:

1. A solvent-free process for preparing a copolymer (P1) of formula (L):

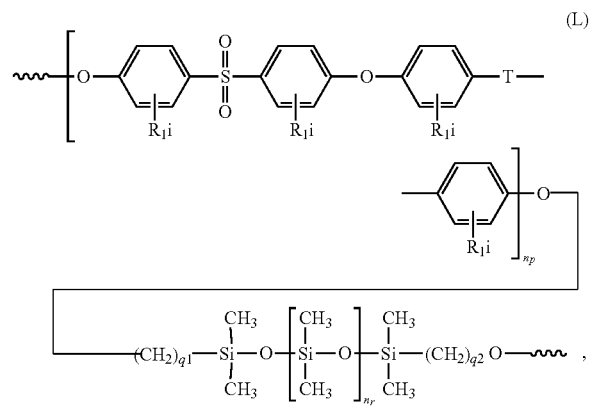

wherein
each $R_1$ is independently selected from the group consisting of a halogen, alkyl, alkenyl, alkynyl, aryl, ether, thioether, carboxylic acid, ester, amide, imide, alkali metal sulfonate, alkaline earth metal sulfonate, alkyl sulfonate, alkali metal phosphonate, alkaline earth metal phosphonate, alkyl phosphonate, amine and quaternary ammonium;
each i is independently selected from 0 to 4;
T is selected from the group consisting of a bond, —O—; —SO$_2$—; —S—; —C(O)—; —C(CH$_3$)$_2$—; —C(CF$_3$)$_2$—; —C(=CCl$_2$); —C(CH$_3$ (CH$_2$CH$_2$COOH)—; —N=N—; —R$_a$C=CR$_b$—; —(CH$_2$)$_m$—; —(CF$_2$)$_m$—; an aliphatic divalent group, linear or branched, of up to 6 carbon atoms; and combinations thereof; in which each R$_a$ and R$_b$, independently of one another, is hydrogen, a C1-C12-alkyl, a C1-C12-alkoxy, or a C6-C18-aryl group;
and in which m is an integer from 1 to 6;
n$_p$ and n$_r$ are respectively the moles % of each recurring units p and r, the recurring units p being of formula (N) and the recurring units r being of following formula:

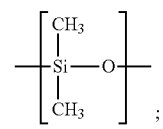

the recurring units p and r are arranged in blocks, in alternation or randomly;
5≤n$_p$<100;
5≤n$_r$<100;

$q_1$ and $q_2$ independently vary between 2 and 14, inclusive, said process comprising reacting via melt hydrosilylation, in a reaction mixture, a poly(aryl ether sulfone) (PAES) polymer (P0) comprising:

recurring units p of formula (N):

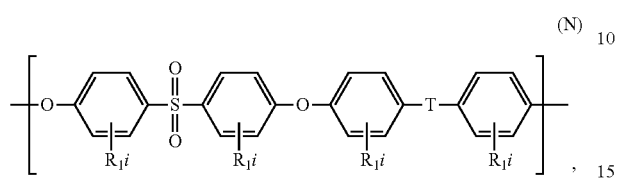

and at least one terminal group of formula (M):

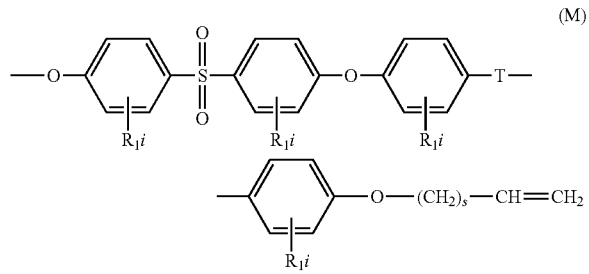

wherein $R_1$, i and T are as above-mentioned and s varies between 0 and 12, inclusive;

with a compound of formula (I):

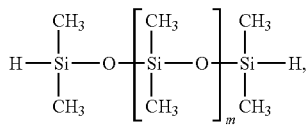

wherein m varies between 1 and 200;

wherein the molar ratio of compound of formula (I)/polymer (P0) is 0.5:1 and 1:0.5;

optionally in the presence of a metal based catalyst;

at a temperature ranging from 150 and 450° C., in the absence of a solvent or in the presence of less than 5 wt. % of a solvent based on the total weight of the reaction mixture.

2. The process of claim 1, wherein T is selected from the group consisting of a bond, —SO$_2$— and —C(CH$_3$)$_2$—.

3. The process of claim 1, wherein $50 \leq n_p < 100$.

4. The process of claim 1, wherein $q_1$ and $q_2$ equal 2.

5. The process of claim 1, wherein i is zero for each $R_1$ of formula (L), (M) and (N).

6. The process of claim 1, being carried out in an agitated reactor, an extruder or in a kneader.

7. The process of claim 1, being carried out in the presence of at least one metal-based catalyst selected from the group consisting of Platinum-based catalysts, Rhodium-based catalysts and Ruthenium-based catalysts.

8. The process of claim 7, wherein the catalyst is Platinum (0)-1,3-divinyl-1,1,3,3-tetramethyldisiloxane or chloroplatinic acid.

9. The process of claim 1, being carried out in the presence of at least one free radical generator.

10. The process of claim 9, wherein the free radical generator is a benzoyl peroxide.

11. A copolymer (P1) being of formula (L-B) or of formula (L-C):

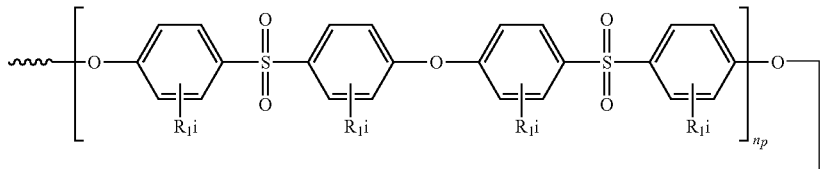

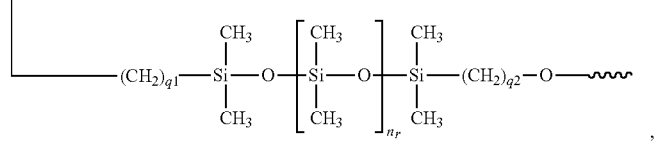

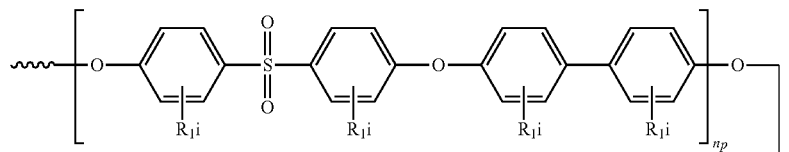

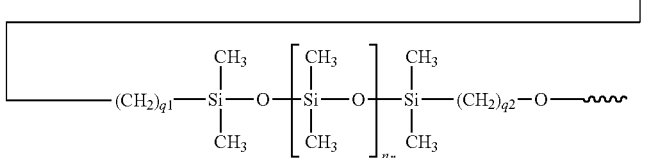

wherein
each $R_1$ is independently selected from the group consisting of a halogen, alkyl, alkenyl, alkynyl, aryl, ether, thioether, carboxylic acid, ester, amide, imide, alkali metal sulfonate, alkaline earth metal sulfonate, alkyl sulfonate, alkali metal phosphonate, alkaline earth metal phosphonate, alkyl phosphonate, amine and quaternary ammonium;

each i is independently selected from 0 to 4;

$n_p$ and $n_r$ are respectively the moles % of each recurring units p and r;

$50 \leq n_p < 100$;

$5 \leq n_r < 100$;

the recurring units p and r are arranged in blocks, in alternation or randomly, $q_1$ and $q_2$ both equal 2.

12. A process for manufacturing a three-dimensional object with an additive manufacturing system, comprising a step consisting in printing layers of the three-dimensional object from a part material comprising a copolymer (P1) being of formula (L-B) or of formula (L-C):

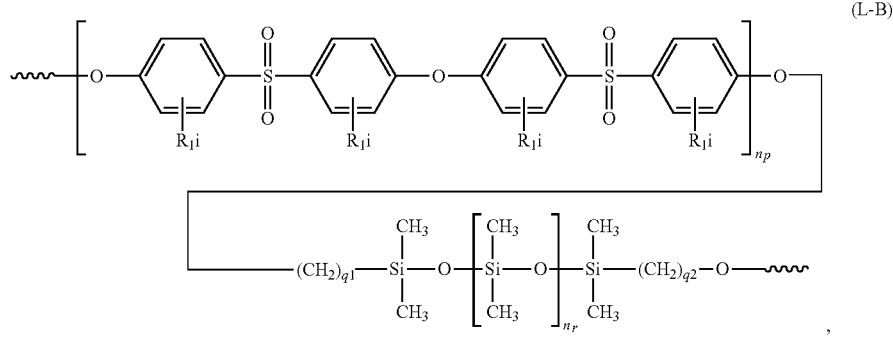

(L-B)

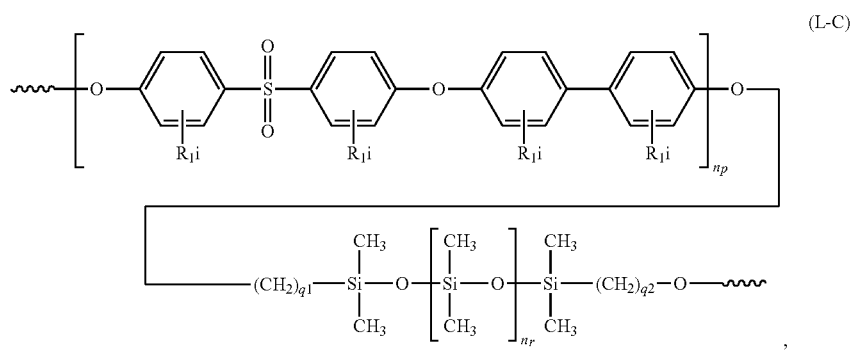

(L-C)

wherein
each $R_1$ is independently selected from the group consisting of a halogen, alkyl, alkenyl, alkynyl, aryl, ether, thioether, carboxylic acid, ester, amide, imide, alkali metal sulfonate, alkaline earth metal sulfonate, alkyl sulfonate, alkali metal phosphonate, alkaline earth metal phosphonate, alkyl phosphonate, amine and quaternary ammonium;

each i is independently selected from 0 to 4;

$n_p$ and $n_r$ are respectively the moles % of each recurring units p and r;

$5 \leq n_p < 100$;

$5 \leq n_r < 100$;

the recurring units p and r are arranged in blocks, in alternation or randomly, $q_1$ and $q_2$ independently vary between 2 and 14, inclusive.

13. A method for molding or overmolding applications, comprising encapsulating fragile components selected from electronic circuit boards or thin strands of wire by using the copolymer (P1) of claim 11, as a hot melt adhesive (HMA).

14. The process of claim 1, being carried out by melt hydrosilylation in the absence of any solvent.

15. The process of claim 1, wherein the temperature is maintained between 25° and 450° C.

16. The process of claim 1, wherein the temperature is maintained between 26° and 320° C.

17. The copolymer (P1) of claim 11, being of formula (L-C'):

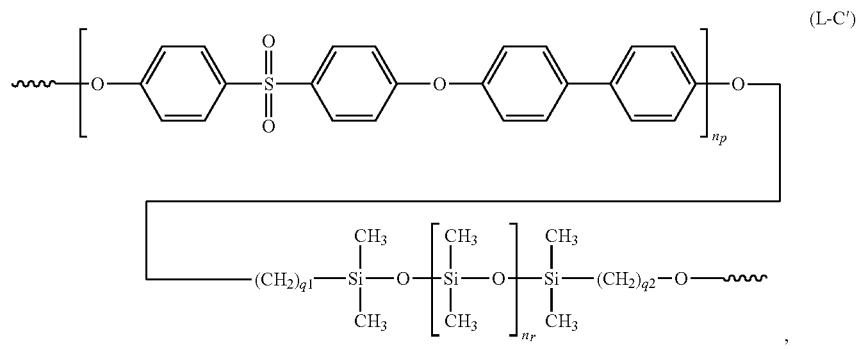
wherein $q_1$, $q_2$, $n_p$, and $n_r$ are the same as defined in claim 11.
18. The process of claim 12, wherein q1 and q2 both equal 2 and wherein $50 \leq np < 100$.
* * * * *